United States Patent
Ouyang et al.

(10) Patent No.: US 7,953,680 B2
(45) Date of Patent: May 31, 2011

(54) COMPUTER PROGRAM PRODUCT FOR EXCLUDING VARIATIONS ATTRIBUTABLE TO EQUIPMENT USED IN SEMICONDUCTOR WAFER MANUFACTURING FROM SPLIT ANALYSIS PROCEDURES

(75) Inventors: Xu Ouyang, Hopewell Junction, NY (US); Yunsheng Song, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 761 days.

(21) Appl. No.: 11/953,274

(22) Filed: Dec. 10, 2007

(65) Prior Publication Data
US 2009/0150811 A1 Jun. 11, 2009

(51) Int. Cl.
G06E 1/00 (2006.01)
(52) U.S. Cl. ............................................. 706/20
(58) Field of Classification Search ............... 706/12–20, 706/62; 703/1
See application file for complete search history.

(56) References Cited

U.S. PATENT DOCUMENTS

| 5,333,240 | A | * | 7/1994 | Matsumoto et al. | 706/20 |
|---|---|---|---|---|---|
| 5,857,321 | A | * | 1/1999 | Rajamani et al. | 60/39.27 |
| 6,014,653 | A | * | 1/2000 | Thaler | 706/16 |
| 7,062,477 | B2 | | 6/2006 | Fujiwara et al. | |
| 2002/0032888 | A1 | * | 3/2002 | Ott et al. | 714/724 |
| 2002/0091875 | A1 | * | 7/2002 | Fujiwara et al. | 709/330 |
| 2003/0144746 | A1 | * | 7/2003 | Hsiung et al. | 700/28 |
| 2004/0111180 | A1 | * | 6/2004 | Kahn et al. | 700/218 |
| 2007/0005311 | A1 | * | 1/2007 | Wegerich et al. | 703/2 |
| 2007/0094060 | A1 | | 4/2007 | Apps et al. | |

* cited by examiner

Primary Examiner — David R Vincent
(74) Attorney, Agent, or Firm — Cantor Colburn LLP; Ian MacKinnon

(57) ABSTRACT

Excluding variations attributable to equipment from split analysis is performed by identifying dependent variables related to at least one of the split analysis or an experiment to be performed. A test is performed to ascertain whether or not a variation attributable to equipment exists with respect to any of the identified dependent variables. If such a variation exists, a target data set and a training data set are constructed. A signature is identified for the variation. A statistical model is selected based upon the identified signature. The selected statistical model is constructed using the training data set to generate a statistical output. The target data set is joined with the statistical output. The identified dependent variables in the target data set are adjusted using the statistical output. The target data set including the adjusted identified dependent variables is loaded to an application for performing split analysis.

9 Claims, 8 Drawing Sheets ered alike in the several FIGURES:
COMPUTER PROGRAM PRODUCT FOR EXCLUDING VARIATIONS ATTRIBUTABLE TO EQUIPMENT USED IN SEMICONDUCTOR WAFER MANUFACTURING FROM SPLIT ANALYSIS PROCEDURES

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates generally to data mining and, more particularly, to methods and computer program products for excluding variations attributable to equipment from split analysis procedures.

2. Description of Background

Existing data mining systems and methods such as decision trees, multidimensional data sources, and data mining work flows have several limitations. In particular, a decision tree may be employed to analyze data structures for the purpose of revealing relationships and patterns. One or more dependent or target variables are identified which define the shape of the tree. Analytical techniques and statistical methods are applied to the tree in order to express revealed relationships and patterns in the form of models or scores. Analytical techniques and statistical methods include, for example, segmentation, split analysis, classification, and estimation.

Data mining may be employed in the context of manufacturing processes such as semiconductor wafer fabrication. For example, wafers in a 300 mm semiconductor fabrication facility will undergo a long sequence of process steps. In order to optimize device performance and improve yield, each individual step has to meet a certain set of target values. Analytical techniques such as split analysis or design of experiments are often used to improve individual processes. Conclusions derived from split analysis need to be as reliable as practicable because these conclusions may impact business decisions.

The results of split analysis are often influenced or confounded by equipment variations such as wafer order effect, variations among a set of tools or chambers, or other types of equipment variations. These equipment variations often create misleading analysis results. For example, one process split results in good wafers, but all wafers in this split are then processed by a defective chamber. Analysis conclusions derived from these wafers will be misleading unless equipment variations are excluded.

One possible solution for improving the reliability of conclusions derived from split analysis is to implement wafer order randomization prior to the experiment. However, this technique is limited by sample size, is complex and difficult to implement on every lot in the development stage, and is not capable of excluding equipment variations. Wafer experiments are expensive to carry out, especially if these experiments need to be performed across a multiplicity of different lots.

A need therefore exists for improved split analysis procedures. A solution that addresses, at least in part, the above and other shortcomings is desired.

SUMMARY OF THE INVENTION

Embodiments of the invention include methods and computer program products for excluding variations attributable to equipment from split analysis procedures. The methods include identifying one or more dependent variables related to at least one of a split analysis or an experiment to be performed. A test is performed to ascertain whether or not a variation attributable to equipment exists with respect to any of the one or more identified dependent variables. If a variation attributable to equipment exists, a target data set and a training data set are constructed. The target data set includes the identified dependent variables. The training data set is any data set from which a statistical model may be constructed. A signature is identified for the variation attributable to equipment. A statistical model is selected based upon the identified signature. The selected statistical model is constructed using the training data set to generate a statistical output. The target data set is joined with the statistical output. The identified dependent variables in the target data set are adjusted using the statistical output. The target data set including the adjusted identified dependent variables is loaded to a data mining or data analysis application for performing split analysis.

The computer program products for excluding variations attributable to equipment from split analysis procedures include a storage medium readable by a processing circuit and storing instructions for execution by the processing circuit for facilitating a method. The method includes identifying one or more dependent variables related to at least one of a split analysis or an experiment to be performed. A test is performed to ascertain whether or not a variation attributable to equipment exists with respect to any of the one or more identified dependent variables. If a variation attributable to equipment exists, a target data set and a training data set are constructed. The target data set includes the identified dependent variables. The training data set is any data set from which a statistical model may be constructed. A signature is identified for the variation attributable to equipment. A statistical model is selected based upon the identified signature. The selected statistical model is constructed using the training data set to generate a statistical output. The target data set is joined with the statistical output. The identified dependent variables in the target data set are adjusted using the statistical output. The target data set including the adjusted identified dependent variables is loaded to a data mining or data analysis application for performing split analysis.

Other methods and computer program products according to embodiments will be or become apparent to one with skill in the art upon review of the following drawings and detailed description. It is intended that all such additional methods and computer program products be included within this description, be within the scope of the present invention, and be protected by the accompanying claims.

BRIEF DESCRIPTION OF THE DRAWINGS

Referring now to the drawings, wherein like elements are numbered alike in the several FIGURES.

The detailed description explains the preferred embodiments of the invention, together with advantages and features, by way of example with reference to the drawings.

DETAILED DESCRIPTION OF THE INVENTION

In the following description, details are set forth to provide an understanding of the invention. In some instances, certain software, circuits, structures and methods have not been described or shown in detail in order not to obscure the invention. The term "data processing system" is used herein to refer to any machine for processing data, including the client/server computer systems and network arrangements described herein. The present invention may be implemented in any computer programming language provided that the operating system of the data processing system provides the facilities that may support the requirements of the present invention. The invention may be implemented with software, firmware, or hardware, or any of various combinations thereof.

Figure 1:
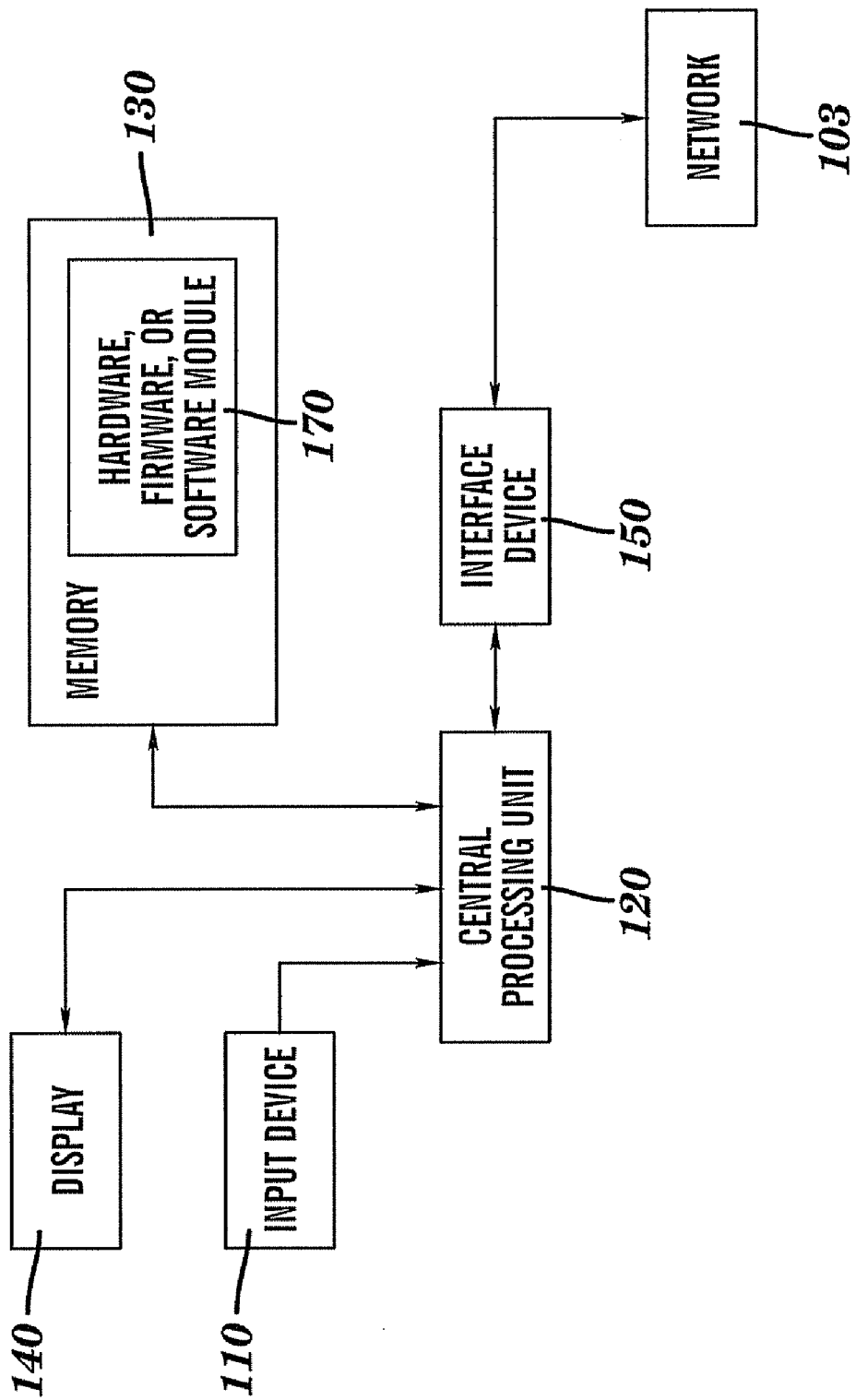
FIG. 1 is a block diagram illustrating an exemplary system on which the methods of the present invention may be performed.

FIG. 1 is a block diagram illustrating an exemplary system on which the methods of the present invention may be performed. It is to be clearly understood that FIG. 1 is illustrative in nature, as other systems, devices, or apparatuses not shown in FIG. 1 may also be used to implement embodiments of the invention. The data processing system 100 includes an input device 110, a central processing unit ("CPU") 120, memory 130, a display 140, and an interface device 150. The input device 110 may include a keyboard, a mouse, a trackball, or a similar device. The CPU 120 may include dedicated coprocessors and memory devices. The memory 130 may include RAM, ROM, databases, or disk devices. The display 140 may include a computer screen, terminal device, a hardcopy producing output device such as a printer or plotter, or a similar device. The interface device 150 may include a connection or interface to a network 103 such as the Internet, an intranet, a local area network (LAN), or a wide area network (WAN).

Optionally, the data processing system 100 may be linked to other data processing systems over the network 103. These other data processing systems may, but need not, include an equipment analysis application. Illustratively, in the field of semiconductor fabrication, this equipment analysis application may include a tool/chamber commonality analysis application, a wafer randomization analysis program, or any other type of application capable of identifying variations attributable to equipment. Of course, the data processing system 100 may contain additional software and hardware, a description of which is not necessary for understanding the invention.

The data processing system 100 has stored therein data representing sequences of instructions which, when executed, cause the methods described hereinafter to be performed. Thus, the data processing system 100 includes computer executable programmed instructions for directing the system 100 to implement any of the embodiments of the present invention. The programmed instructions may be embodied in at least one hardware, firmware, or software module 170 resident in the memory 130 of the data processing system 100. Alternatively or additionally, the programmed instructions may be embodied on a computer readable medium (such as a CD disk or floppy disk) which may be used for transporting the programmed instructions to the memory 130 of the data processing system 100. Alternatively or additionally, the programmed instructions may be embedded in a computer-readable, signal or signal-bearing medium that is uploaded to the network 103 by a vendor or supplier of the programmed instructions, and this signal or signal-bearing medium may be downloaded through an interface 150 to the data processing system 100 from the network by end users or potential buyers.

Figure 2:
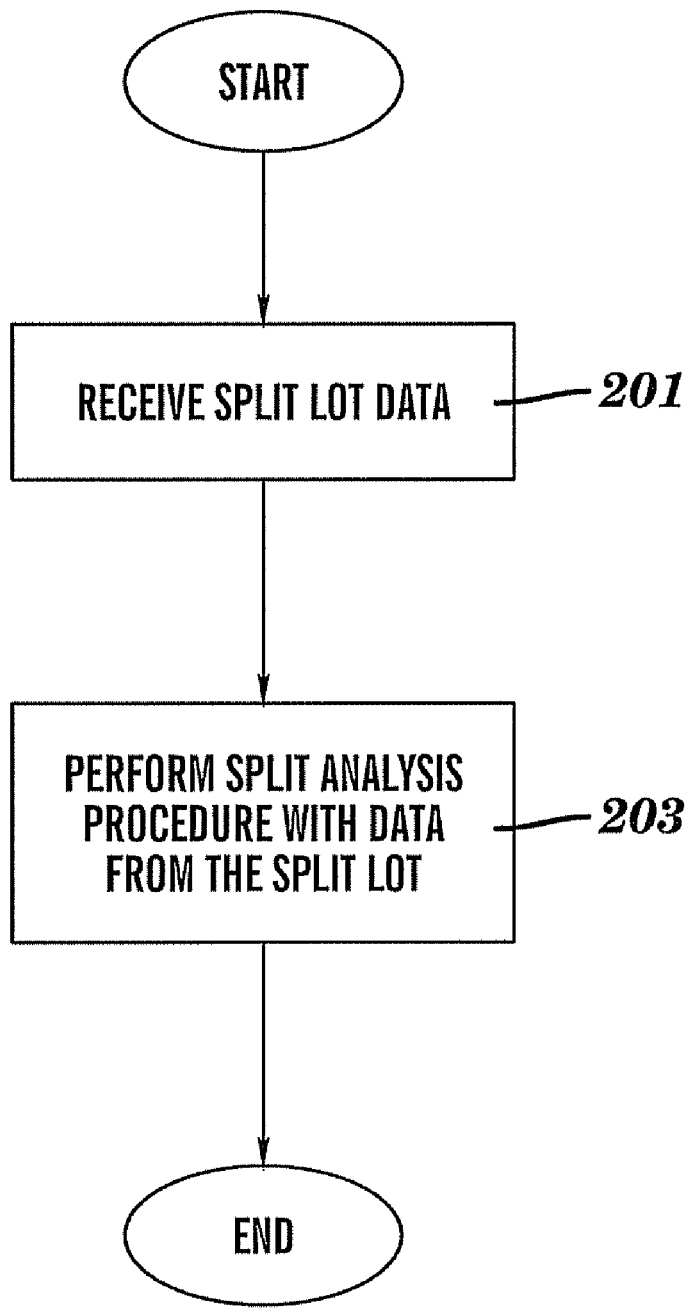
FIG. 2 is a flow diagram describing a prior art method for performing a split analysis procedure.

FIG. 2 is a flow diagram describing a prior art method for performing a split analysis procedure. The procedure commences at block 201 where split lot data is received. Next, at block 203, a split analysis procedure is performed directly with data from the split lot. For example, a user may select dependent variables which are related, or suspected of being related, to a split or experiment to be performed. The user may then initiate generation of trend charts or scatter plots which are grouped by splits, so as to reveal one or more effects of the split. This methodology does not account for variations attributable to equipment. Moreover, even if a user observes an effect that is believed to be attributable to equipment, there is no way of excluding this effect from the split analysis procedure or experiment. Without excluding these equipment effects, the results of the split analysis procedure are not reliable.

Occasionally, engineers may redo an experiment or a split analysis procedure in an attempt to exclude or minimize equipment effects. In some cases, this may require an iterative approach involving more than one repetition of the experiment or analysis. However, redoing experiments is costly and time-consuming, delaying the development of new technology.

Figure 3A:
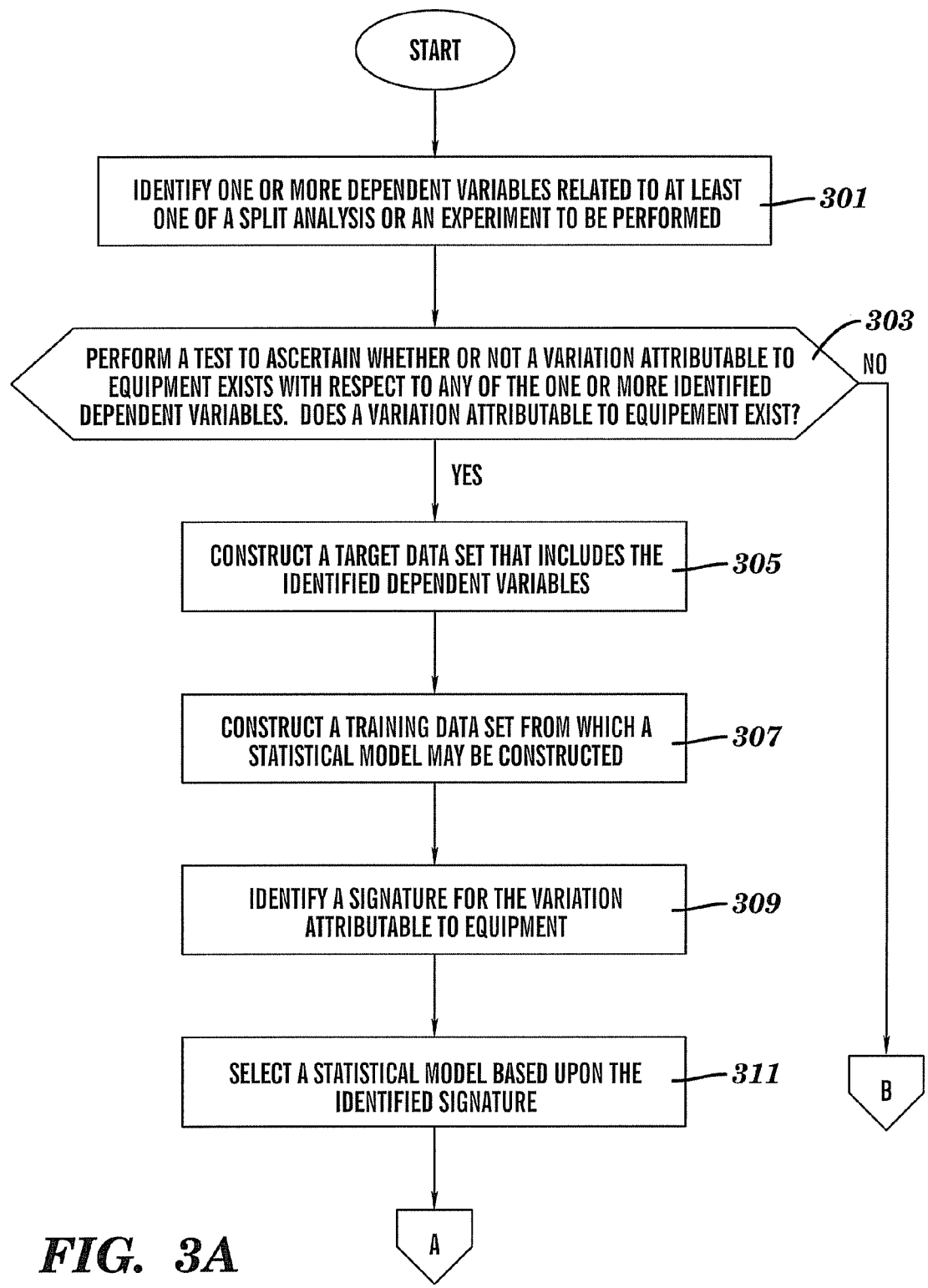
FIGS. 3A and 3B together comprise a flow diagram describing an exemplary method for excluding variations attributable to equipment from split analysis procedures.
Figure 3B:
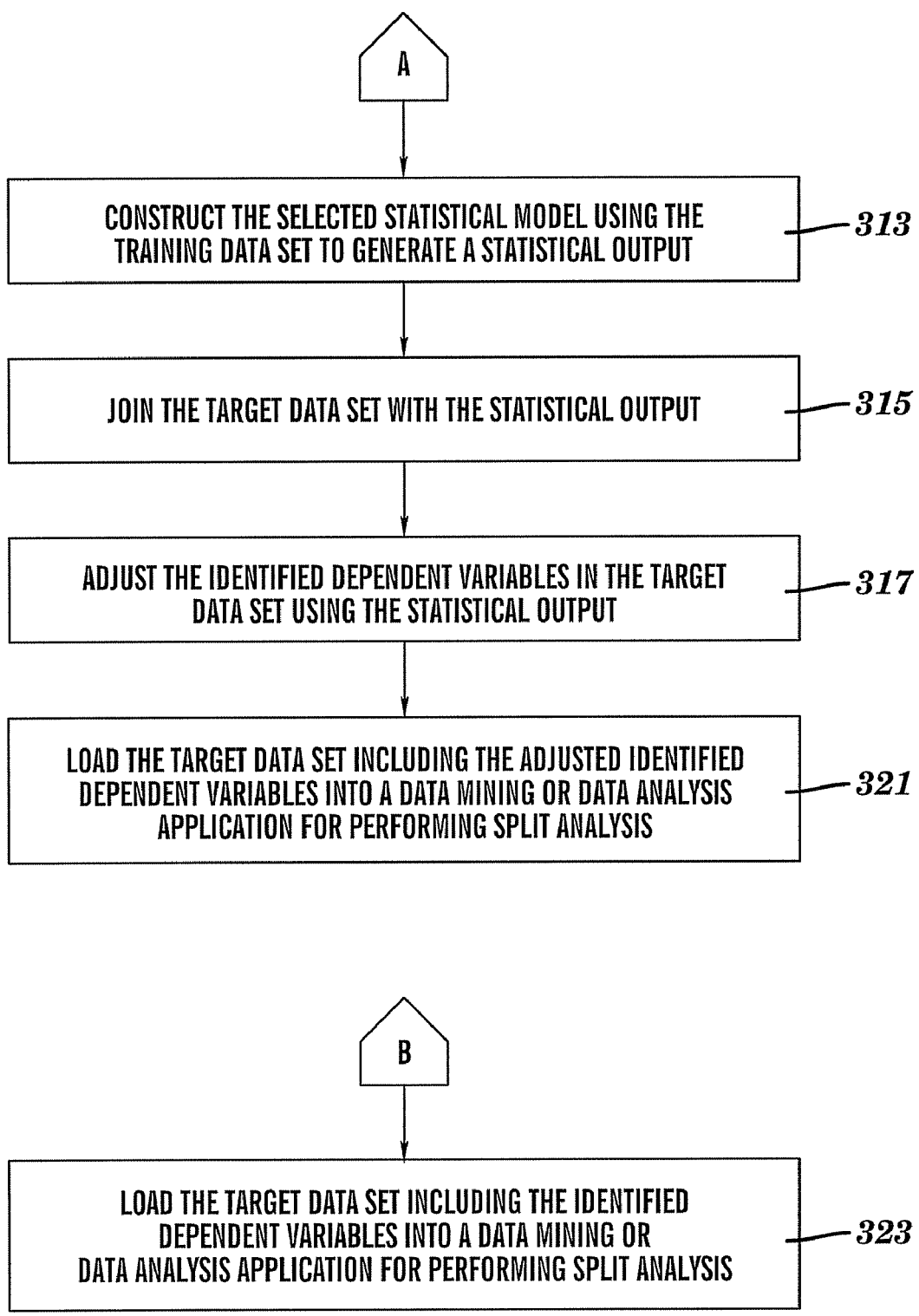

FIGS. 3A and 3B together comprise a flow diagram describing an exemplary method for excluding variations attributable to equipment from split analysis procedures. The procedure commences at block 301 (FIG. 3A) where one or more dependent variables are identified that are related to at least one of a split analysis or an experiment to be performed. Next, at block 303, a test is performed to ascertain whether or not a variation attributable to equipment exists with respect to any of the one or more identified dependent variables. Optionally, block 303 may, but need not, be performed in conjunction with a tool chamber commonality analysis program, a wafer randomization analysis program, or any other program which can identify variations attributable to equipment. The negative branch from block 303 leads to block 323 (FIG. 3B) where the target data set including the identified dependent variables is loaded into a data mining or data analysis application for performing split analysis.

If a variation attributable to equipment exists as determined by the test performed at block 303 (FIG. 3A), a target data set is constructed (block 305) and a training data set is constructed (block 307). Blocks 305 and 307 could be performed in any order or substantially simultaneously. The target data set includes the identified dependent variables. The training data set is any data set from which a statistical model may be constructed. For example, the target data set may contain a plurality of numerical variables which can be used for split definition variables in split analysis, as well as a plurality of equipment related variables.

In the context of semiconductor fabrication, these equipment related variables may, but need not, include any of a tool identifier (id), a chamber id, a front opening unified pod (FOUP) slot location, a track identifier as may be utilized in the context of photolithography equipment, or one or more process step identifiers. A FOUP is a specialized plastic enclosure designed to hold silicon wafers securely and safely in a controlled environment, and to allow the wafers to be removed for processing or measurement by tools equipped with appropriate load ports and robotic handling systems. The training data set may also contain a plurality of numerical variables which can be used for split definition variables in split analysis, as well as a plurality of equipment related variables such as the tool id, the chamber id, the FOUP slot location, or the one or more process step identifiers. Illustratively, the target data set could be a subset of the training data set. As a practical matter, the training data set may, but need not, include larger volume data than the target dataset. If desired, a user could employ the target data set as a training data set. This may be useful, for example, in the context of a development environment where a data limitation is in place.

Next, at block 309, a signature is identified for the variation attributable to equipment. A statistical model is selected based upon the identified signature (block 311). Illustratively, a statistical model is selected from a set of statistical models that includes a first statistical model for implementing analysis of means, and a second statistical model for implementing linear regression. The selected statistical model is constructed using the training data set to generate a statistical output (FIG. 3B, block 313). For example, based on the identified signature, a model is constructed for each of a plurality of numerical variables in the training data set by using the first statistical model (analysis of means), or the second statistical model (linear regression). The target data set is joined with the statistical output (block 315). The identified dependent variables in the target data set are adjusted using the statistical output (block 317). The target data set including the adjusted identified dependent variables is loaded to a data mining or data analysis application for performing split analysis (block 321).

Assume, for illustrative purposes, that the procedure of FIGS. 3A-3B is to be performed in the illustrative operational environment of semiconductor fabrication. Accordingly, if the equipment variation is tool variation or chamber variation, the first statistical model may be employed, whereas if numerical variables show linear correlation with a parameter such as FOUP slot location, then the second statistical model may be employed. If the analysis of means statistical model is employed in the training data set analysis, then the output of the statistical model has means for all numerical variables grouped by equipment identifiers. Accordingly, when the output of the statistical model is subsequently joined with the target data set by equipment identifiers, then the variables in the target dataset are adjusted by the means of each of the variables grouped by equipment identifiers. Adjusted variables are thus created in the target data set.

Continuing with the foregoing example drawn from the operational environment of semiconductor fabrication, if the linear regression statistical model is employed in training data set analysis, then the output of the model has predicted values for all numerical variables grouped by FOUP slot location identifiers. Upon joining the output of the linear regression model with target data set by FOUP slot location identifiers, then the variables in the target dataset are adjusted by the predicted values of each variables grouped by FOUP slot location identifiers. Adjusted variables are thus created in the target data set.

Figure 4:
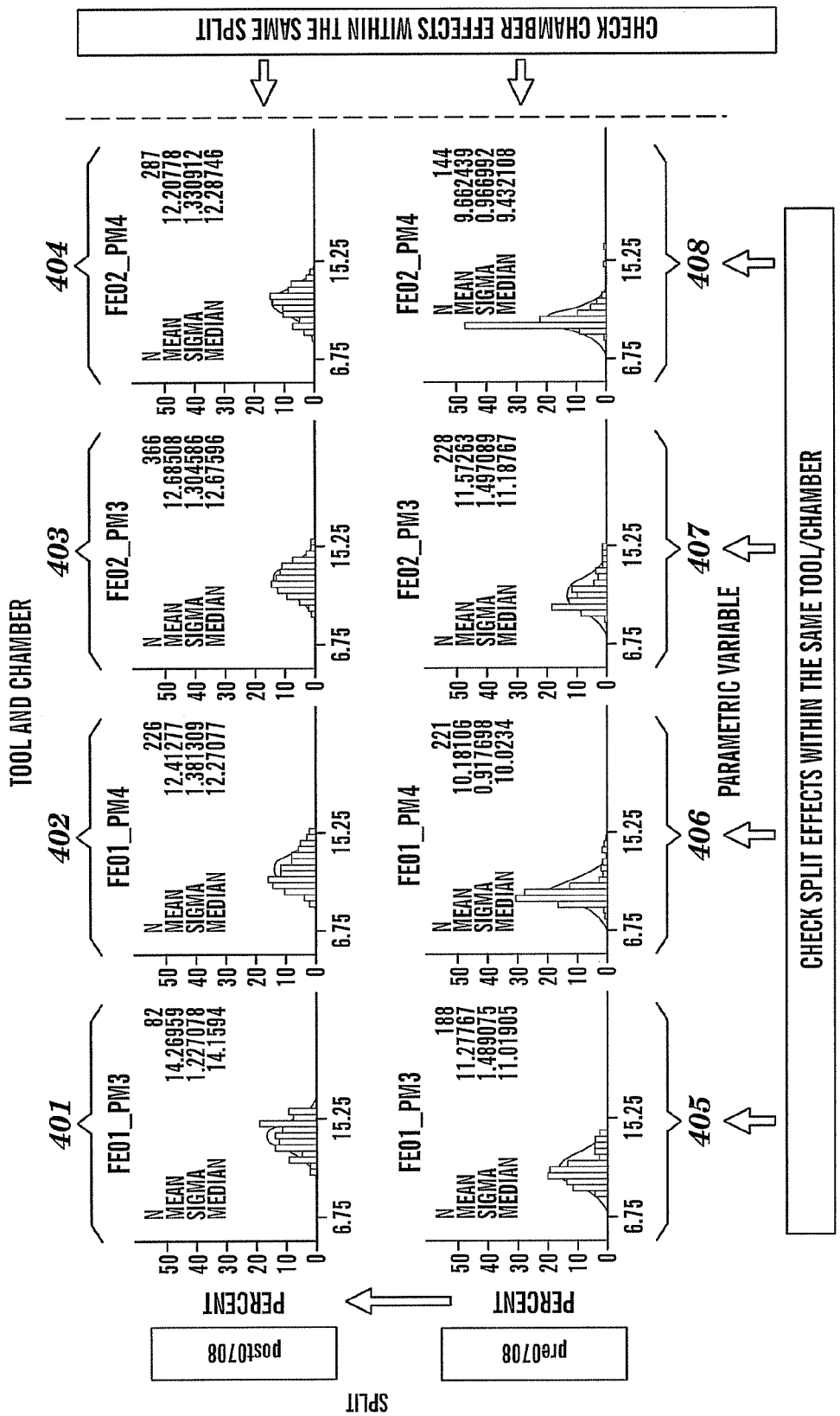
FIG. 4 shows an illustrative graphical user interface for performing a combination analysis of splits and variations attributable to equipment.

FIG. 4 shows an illustrative graphical user interface for performing a combination analysis of splits and variations attributable to equipment in the illustrative operational environment of semiconductor fabrication. The graphical user interface provides a mechanism for visually displaying a first magnitude indicative of an extent to which tool variation will impact the split analysis relative to a second magnitude indicative of an extent to which chamber variation will impact the split analysis. A split identified as including pre0708 and post0708 is displayed along the y-axis, with a parametric variable displayed along the x-axis for each of a plurality of tools and chambers. For example, a first cell 401, a second cell 402, a third cell 403, and a fourth cell 404 display information pertaining to a split designated as post0708. A fifth cell 405, a sixth cell 406, a seventh cell 407, and an eighth cell 408 display information pertaining to a split designated as pre0708.

Each of the cells 401-408 corresponds to a specific tool and chamber. For example, the first cell 401 and the fifth cell 405 display information for a tool identified as FE01 and a chamber identified using a chamber identifier of PM3. Similarly, the second cell 402 and the sixth cell 406 display information for the tool identified as FE01 and a chamber identified using a chamber identifier of PM4. Likewise, the third cell 403 and the seventh cell 407 display information for a tool identified as FE02 and the chamber identified using the chamber identifier of PM3. Finally, the fourth cell 404 and the eighth cell 408 display information for the tool identified as FE02 and the chamber identified using the chamber identifier of PM4.

The graphical user interface of FIG. 4 permits a user to check split effects within the same tool or the same chamber, or within the same tool and the same chamber. Moreover, the graphical user interface of FIG. 4 permits the user to check chamber effects within the same split. For example, comparing two or more cells along a vertical column of the graphical user interface, such as the first cell 401 and the fifth cell 405, enables the user to check split effects within the same tool FE01 and the same chamber PM3. On the other hand, comparing two or more cells along a horizontal row of the graphical user interface, such as the first cell 401, the second cell 402, the third cell 403, and the fourth cell 404, enables the user to check chamber effects within the same split, such as split post0708. In this manner, the graphical user interface of FIG. 4 may be employed by a user to reveal the extent to which tool variation or chamber variation can impact the results of split analysis.

Figure 5:
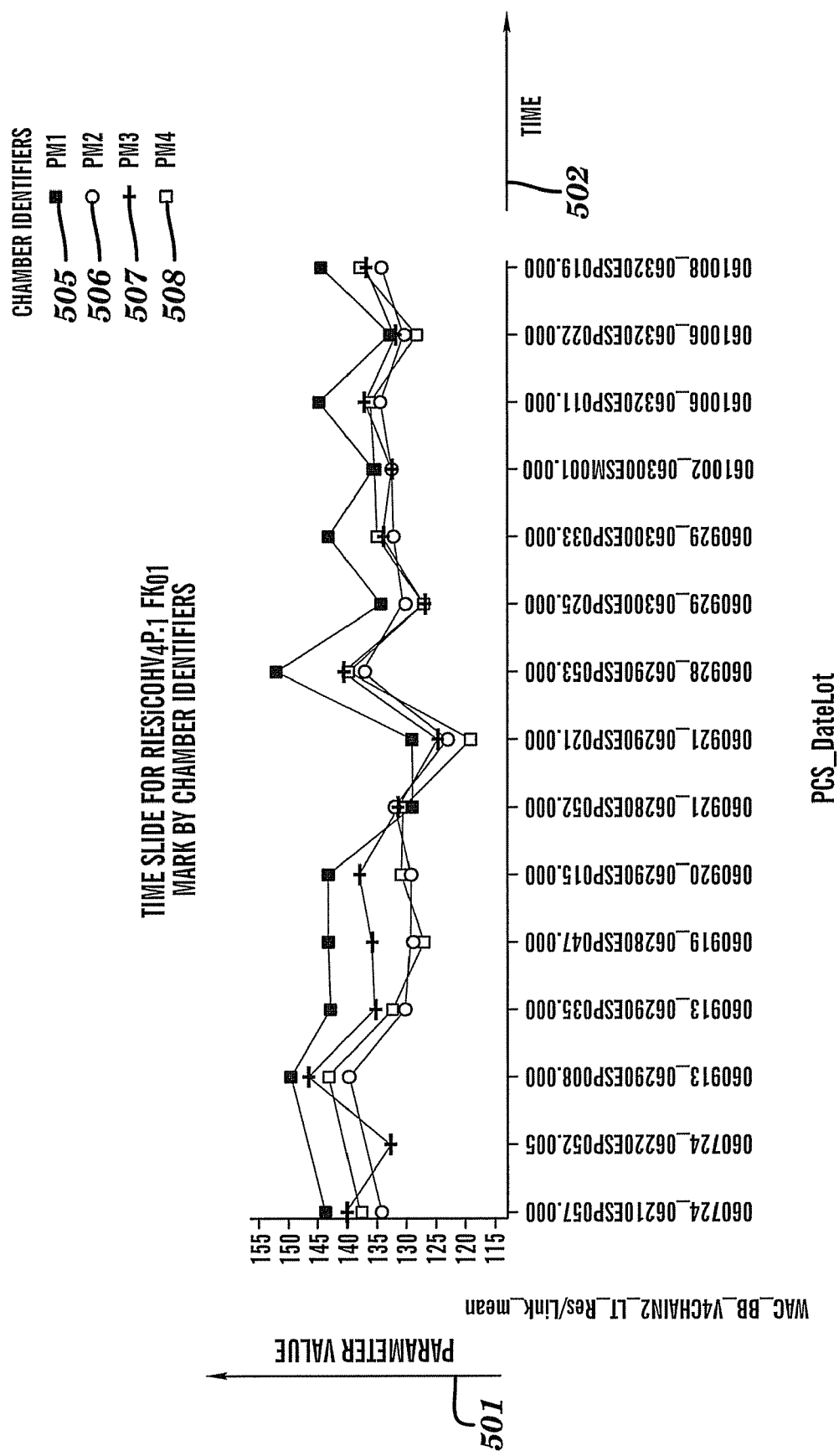
FIG. 5 is a graph showing a first example of a variation attributable to equipment.

FIG. 5 is a graph showing a first example of a variation attributable to equipment. A parameter value 501 is displayed along the y-axis, with the x-axis representing time 502. The graph displays parameter value 501 as a function of time 502 for each of a plurality of chambers identified by specific chamber identifiers. In the present example, the chamber identifiers include a first chamber identifier 505 specifying a first chamber PM1, a second chamber identifier 506 specifying a second chamber PM2, a third chamber identifier 507 specifying a third chamber PM3, and a fourth chamber identifier 508 specifying a fourth chamber PM4. Display of parameter values for four chambers is illustrative, as the graph of FIG. 5 may display information for any number of two or more chambers.

In the present example, the parameter value 501 represents a value for a tool designated as FK01 performing an operation designated as V4_Chain_Res. By observing the graph of FIG. 5, it is apparent that the first chamber PM1 has a significantly higher value for parameter value 501 than the second, third, and fourth chambers PM2, PM3 and PM4. By selecting an analysis of mean statistical model and applying this model to the information shown in FIG. 5, the target data set may be adjusted as previously described with reference to FIGS. 3A and 3B.

Figure 6:
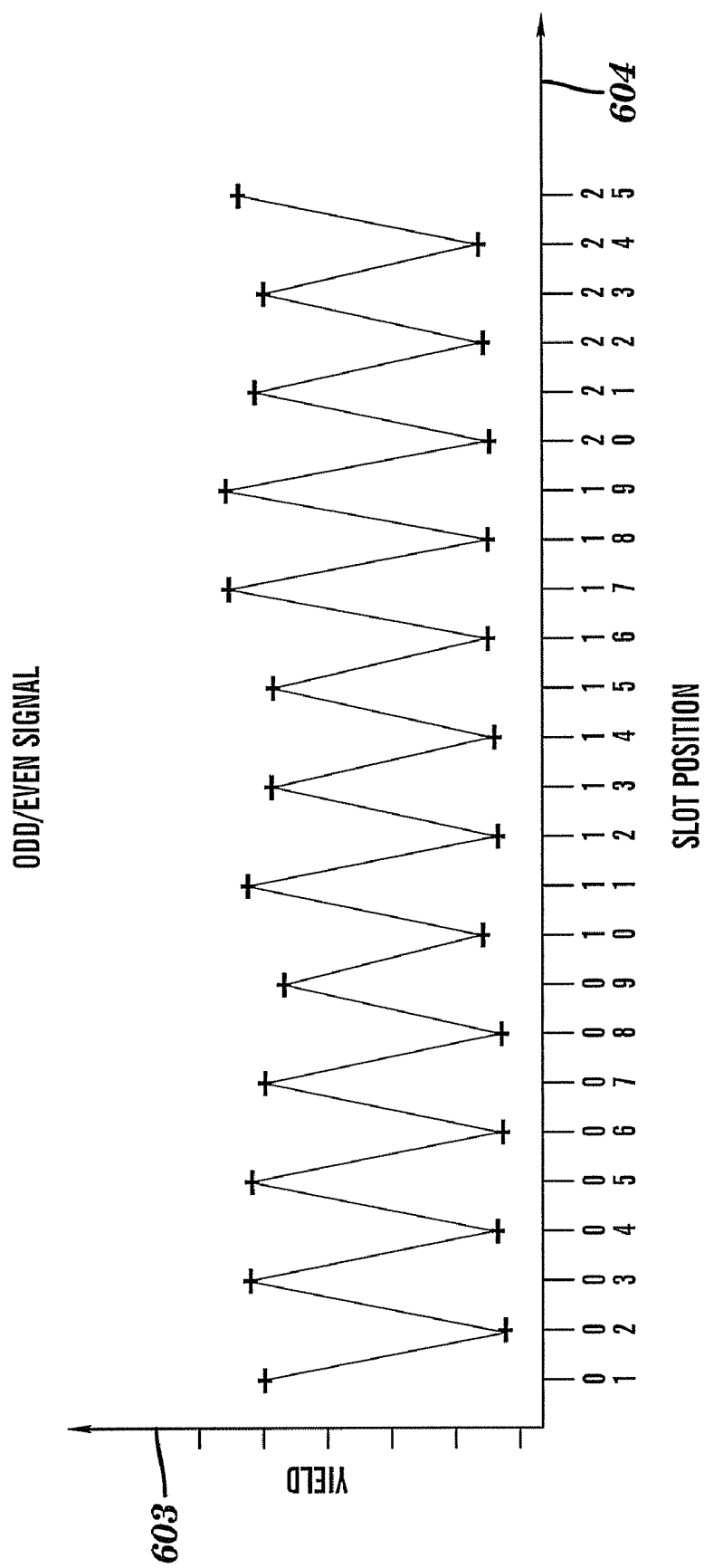
FIG. 6 is a graph showing a second example of a variation attributable to equipment.

FIG. 6 is a graph showing a second example of a variation attributable to equipment. The graph displays a yield 603 as a function of a FOUP slot position 604. Observe that the yield 603 is significantly higher for odd-numbered slot positions, such as positions 01, 03, and 05, relative to even-numbered slot positions, such as slot positions 02, 04, and 06. In the absence of a variation attributable to equipment, one would expect the yields from even-numbered positions to be about the same as the yields from odd-numbered positions. By selecting an analysis of mean statistical model and applying this model to the information shown in FIG. 6, the target data set may be adjusted as previously described with reference to FIGS. 3A and 3B.

Figure 7:
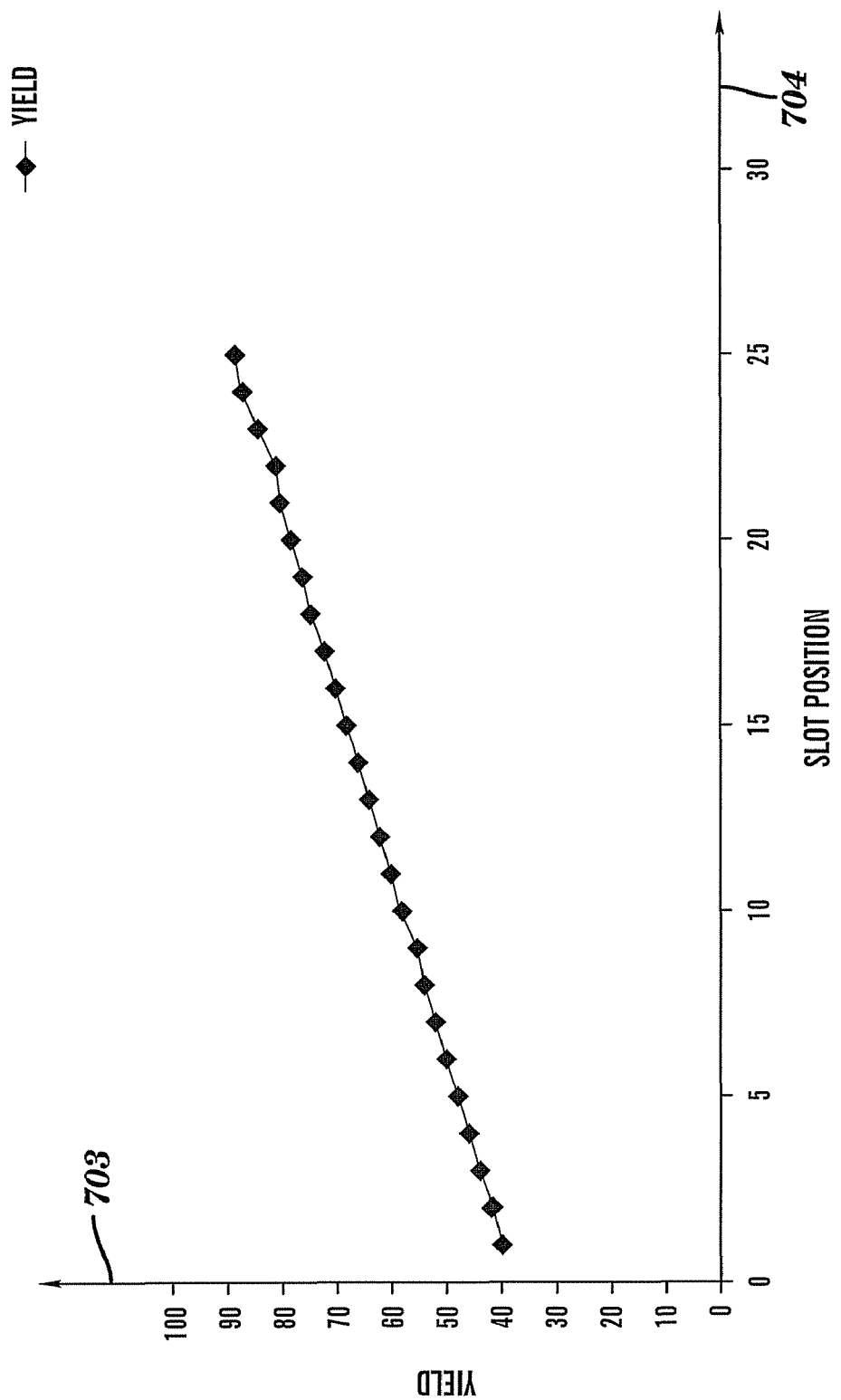
FIG. 7 is a graph showing a third example of a variation attributable to equipment.

FIG. 7 is a graph showing a third example of a variation attributable to equipment. The graph displays a yield 703 as a function of a FOUP slot position 704. Yield 703 is displayed along the y-axis, whereas slot position 704 is displayed along the x-axis. Yield 703 may represent, for example, a static random access memory (SRAM) yield or a functional test yield. Observe that the yield 703 is a substantially linear function of slot position 704. In this example, the training data set (FIGS. 3A and 3B) may be employed to construct a linear statistical model such as $Y=a+bX$. In this linear statistical model, Y is the dependent variable, and X is the slot position. The linear statistical model is used to predict Y for each slot position. Then the predicted Y value is used to adjust the target data set across different slot positions. Adjusting the target data set was previously described with reference to FIGS. 3A and 3B.

As indicated above, the methods described herein may, but need not, link to other applications or systems, such as a tool chamber commonality analysis program, a wafer randomization analysis application, or another application which can identify equipment variations.

Although some of the foregoing examples were drawn from the field of semiconductor processing, this is only for purposes of illustration, as it is to be clearly understood that the invention encompasses any operational environment where variations attributable to equipment are to be excluded from split analysis procedures.

The capabilities of the present invention can be implemented in software, firmware, hardware or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer program product for excluding variations attributable to equipment used in a semiconductor wafer manufacturing process from split analysis procedures, the computer program product including a storage medium readable by a processing circuit and storing instructions for execution by the processing circuit for facilitating a method including:
   identifying one or more dependent variables related to a split analysis performed using data from a split lot of semiconductor wafers manufactured by equipment the semiconductor wafer manufacturing process;
   performing a test to ascertain whether or not a variation attributable to the equipment used in the semiconductor wafer manufacturing process exists with respect to any of the one or more identified dependent variables;
   if a variation attributable to the equipment exists, constructing a target data set and a training data set, wherein the target data set includes the identified dependent variables, a plurality of numerical variables used to implement split definition variables in split analysis, and a plurality of equipment-related variables related to the equipment used in the semiconductor manufacturing process, and wherein the training data set includes any data set from which a statistical model may be constructed;
   identifying a signature for the variation attributable to the equipment used in the semiconductor manufacturing process;
   selecting a statistical model based upon the identified signature;
   constructing the selected statistical model using the training data set to generate a statistical output;
   joining the target data set with the statistical output;
   adjusting the identified dependent variables in the target data set using the statistical output; and
   providing a graphical user interface that visually displays an extent to which at least one of the equipment-related variables impacts the split analysis.

2. The computer program product of claim 1 further comprising instructions for loading the target data set including the adjusted identified dependent variables into a data mining or data analysis application to perform split analysis.

3. The computer program product of claim 1 wherein performing the test to ascertain whether or not a variation attributable to equipment exists with respect to any of the one or more identified dependent variables is performed in conjunction with a tool chamber commonality analysis program or a wafer randomization analysis program.

4. The computer program product of claim 1 wherein the plurality of equipment related variables include any of a tool identifier, a chamber identifier, a track identifier, a front opening unified pod (FOUP) slot location, or one or more semiconductor wafer manufacturing process step identifiers.

5. The computer program product of claim 1 wherein the target data set is a subset of the training data set, or wherein the target data set is the training data set.

6. The computer program product of claim 1 wherein the selected statistical model implements an analysis of means.

7. The computer program product of claim 1 wherein the selected statistical model implements a linear regression.

8. The computer program product of claim 1 wherein, if the variation attributable to equipment is a tool variation or a chamber variation or both, the selected statistical model implements an analysis of means and wherein, if the variation attributable to equipment shows a linear correlation with any parameter, the selected statistical model implements a linear regression.

9. The computer program product of claim 1 wherein providing a graphical user interface that visually displays an extent to which at least one of the equipment-related variables impacts the split analysis comprises providing a graphical user interface that visually displays a first magnitude indicative of an extent to which tool variation impacts the split analysis relative to a second magnitude indicative of an extent to which chamber variation impacts the split analysis.

* * * * *